Feb. 18, 1936.　　　J. J. McCABE　　　2,031,380
LENS BLOCKING DEVICE
Filed Aug. 10, 1931　　　3 Sheets-Sheet 1

JOSEPH J. McCABE
INVENTOR

BY G. A. Ellestad
ATTORNEY

Feb. 18, 1936.　　　J. J. McCABE　　　2,031,380
LENS BLOCKING DEVICE
Filed Aug. 10, 1931　　　3 Sheets-Sheet 2

JOSEPH J. McCABE
INVENTOR
BY
ATTORNEY

Feb. 18, 1936.  J. J. McCABE  2,031,380
LENS BLOCKING DEVICE
Filed Aug. 10, 1931  3 Sheets-Sheet 3
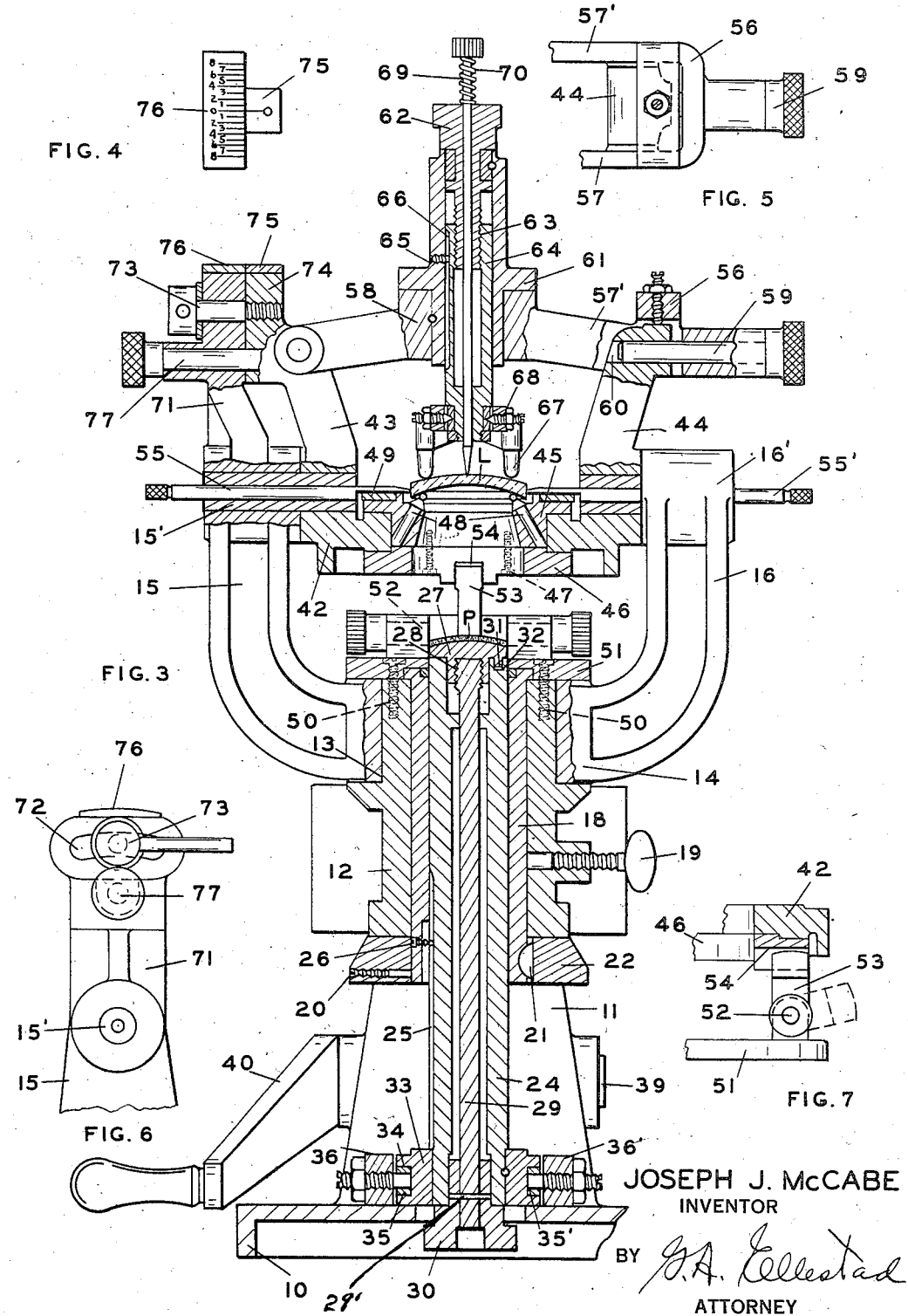
JOSEPH J. McCABE
INVENTOR
BY G. A. Ellestad
ATTORNEY Patented Feb. 18, 1936

2,031,380

UNITED STATES PATENT OFFICE 2,031,380

LENS BLOCKING DEVICE

Joseph J. McCabe, Rochester, N. Y., assignor to Bausch & Lomb Optical Company, Rochester, N. Y., a corporation of New York Application August 10, 1931, Serial No. 556,147

13 Claims. (Cl. 51—277)

This invention relates to a lens blocking device and more particularly it has reference to an improved means for blocking a single lens preparatory to grinding the desired curvatures on the surfaces of the lens.

One of the objects of my invention is to provide an improved lens blocking device which will afford convenience and efficiency in use. Another object is to provide means for blocking a lens preparatory to grinding so that the finished lens will have its cylinder axis, amount of prism and base of prism properly ground and located. A further object is to provide scale means for indicating the amount of prism, location of prism base and cylinder axis of the lens that is being blocked. Other objects are to provide means for accurately locating the lens and means for holding the lens in position on the blocking device. To these and other ends the invention resides in certain improvements and combinations of parts as will hereinafter be more fully described, the novel features being pointed out in the claims at the end of this specification.

Referring to the drawings:

Fig. 3 is a vertical sectional view of my device with parts in elevation.

Fig. 4 is a view of the prism indicating scale.

Figs. 5, 6 and 7 are fragmentary detail views.

Fig. 8 is a plan view of the lens support and scale means.

Similar reference characters refer to similar parts throughout the several views of the drawings.

Figure 1:
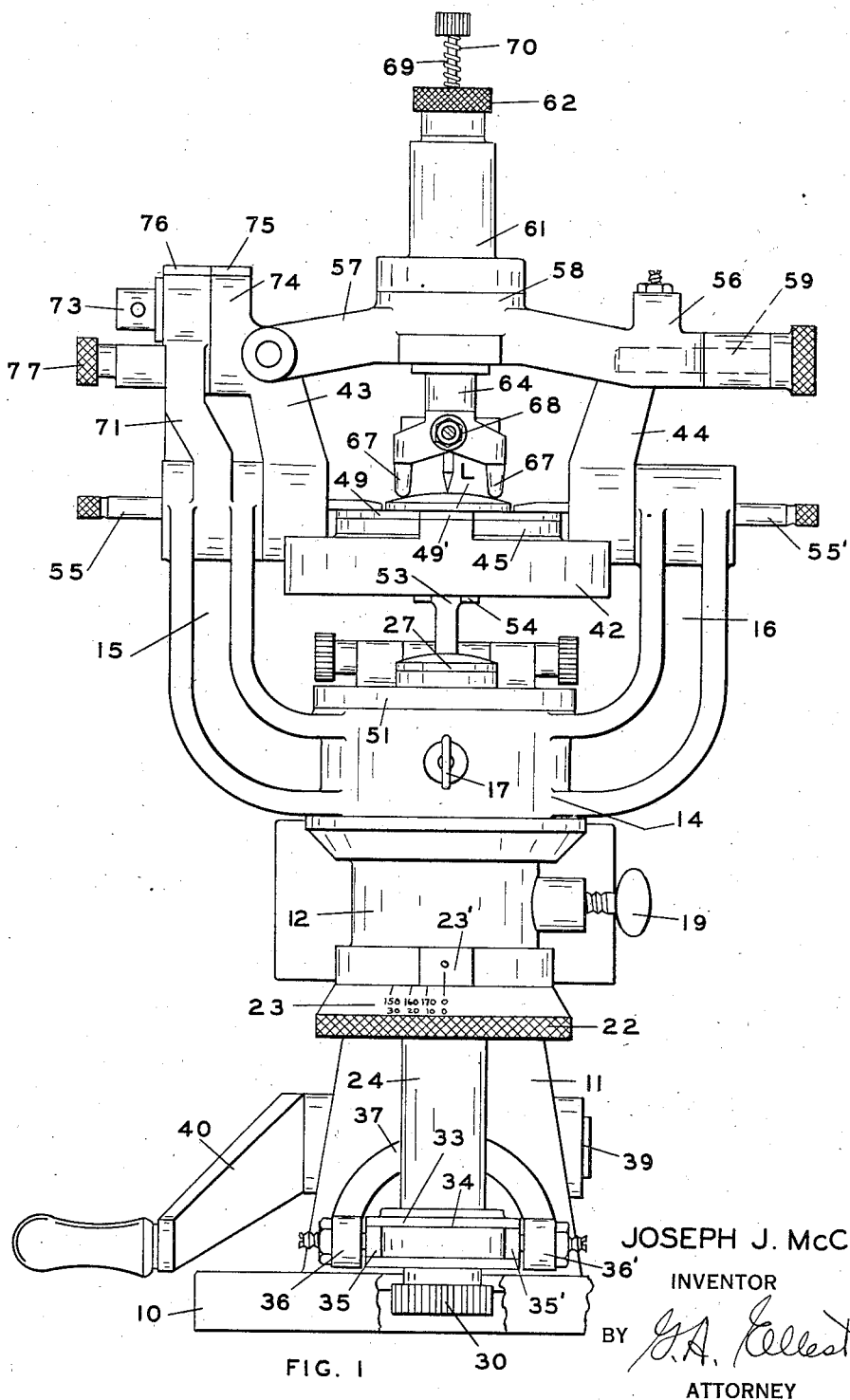
Fig. 1 shows a front elevation of my device.
Figure 2:
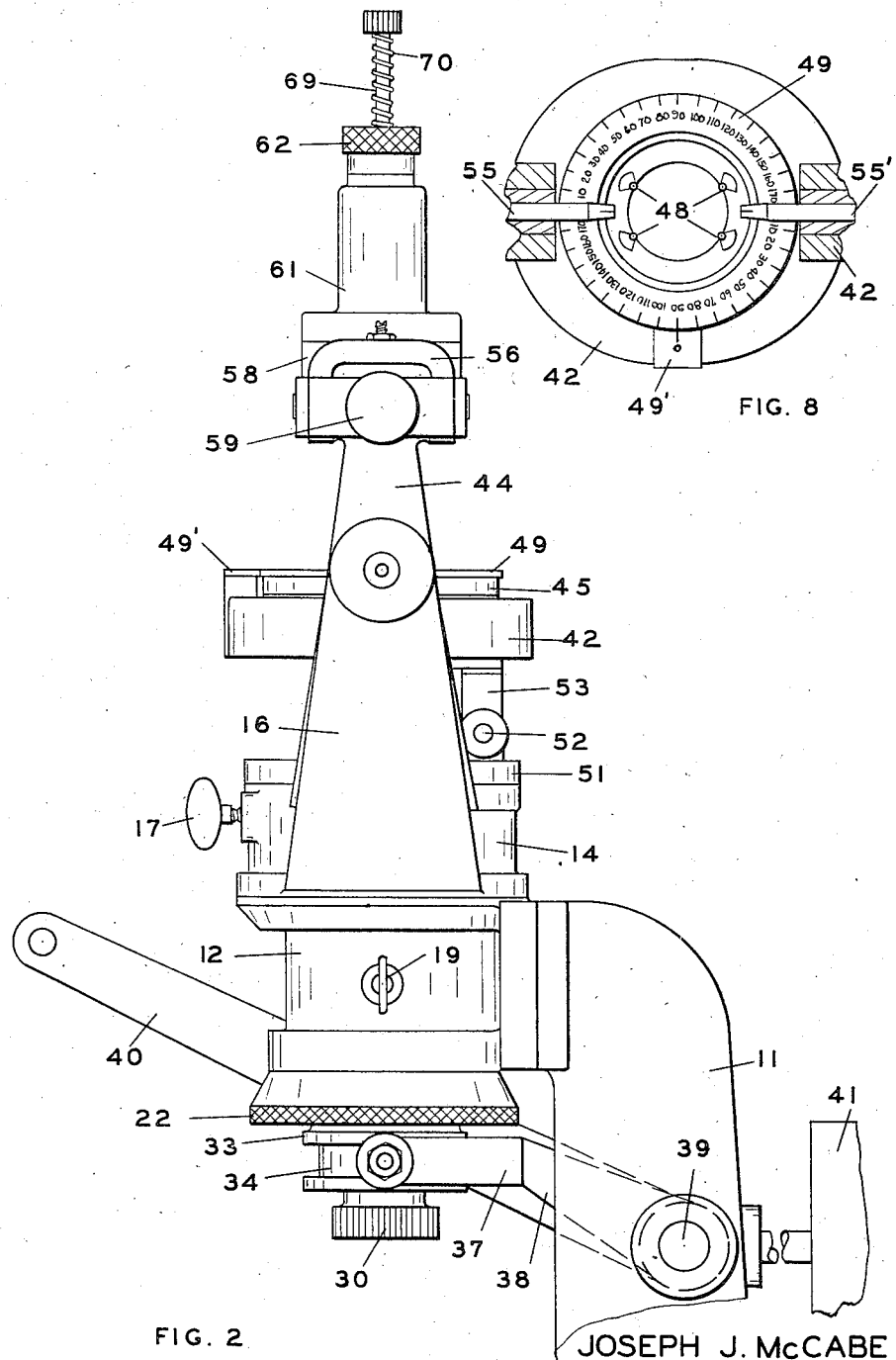
Fig. 2 is an end elevation of same.

One embodiment of my invention is illustrated in the drawings wherein 10 indicates a base plate having an upright supporting bracket 11 which carries the cylindrical body member 12. The body member 12 has a bearing portion 13 on which is rotatably mounted a yoke 14 having the two upstanding arms 15 and 16. A set screw 17 releasably locks the yoke 14 against rotation on the bearing portion 13. Rotatably mounted within the bore of body member 12 is a bushing 18 which can be releasably locked against rotation by means of screw 19 which is threaded in body member 12. Fixed to the lower end of bushing 18 by means of set screw 20 and key 21 is a collar 22 having a bevel edge on which is inscribed the scale means 23 which cooperates with an index 23' carried by body 12, for a purpose to be hereinafter described.

A cylindrical plunger 24 is slidably mounted within bushing 18 and is keyed thereto by slot 25 and pin 26 so that the plunger 24 will rotate with bushing 18 when collar 22 is rotated. The upper end of plunger 24 is adapted to carry a lens block 27 having a threaded portion 28 so that the block 27 may be detachably secured to the plunger 24 by means of the threaded rod 29 which can be turned by the knurled knob 30 pinned to said rod by a pin 29'. The lens block 27 has a downwardly projecting locating pin 31 which cooperates with an opening 32 in plunger 24. The lower end of plunger 24 is secured to a circular disk 33 having a circumferential groove 34 which is slidably engaged by the two bearing members 35 and 35' carried on the two ends 36 and 36' of a yoke 37. The yoke 37 is connected to an arm 38 which is secured to a shaft 39 pivotally carried by bracket 11. An operating arm 40 is also secured to shaft 39 so that the plunger 24, carrying the lens block 27, can be moved vertically up and down by means of the arm 40. A counter-balancing weight 41 may also be secured to shaft 39.

Pivotally mounted to turn about a horizontal axis in bearings 15' and 16', provided by arms 15 and 16, is a table member 42 having the two integral upstanding arms 43 and 44. Rotatably mounted to turn on table 42 is the ring member 45 to the under side of which a plate 46 is secured by screws 47. Four spaced pins 48, for supporting lens L, are fixedly secured to ring 45 and a circular scale 49, secured to the top face of ring 45, cooperates with an index line on plate 49' secured to table 42. Fixedly secured to body member 12 by screws 50 is a plate 51 on which is rotatably mounted a stub shaft 52 carrying a lug 53 which can be moved to selectively cooperate with a notch 54 formed in the edge of plate 46, the purpose of which will be hereinafter explained. Two locating pins 55 and 55' are slidably mounted on the bearing members 15' and 16' so that the axes of the two pins coincide with the axis about which the table member 42 turns.

The arm 43 pivotally suports one end of a bridge 56 having the two arms 57 and 57' which support a central, integral boss 58. The free end of bridge 56 is adapted to rest on the top of arm 44 and the bridge may be selectively locked in position by means of a pin 59 which is adapted to slidably engage an opening 60 in arm 44. Fixedly secured to boss 58 is a bushing 61 in which is rotatably mounted a screw 62 which cooperates with a threaded portion 63 on a slidable supporting rod 64 which is locked against rotation by means of a pin 65 and slot 66. The lower end of rod 64 carries two pairs of spaced lens-engaging fingers 67, each pair of which is supported on a gimbal joint 68. Slidably mounted within a central bore in screw 62 and rod 64 is a centering rod 69 which is normally held out of engagement with the lens L by a coil spring 70. When the bridge 56 is locked by pin 59, the lens blank L can be firmly clamped down against supporting pins 48 by turning screw 62. The universal mounting of the lens-engaging fingers 67 permits them to conform to the surface of any lens and compensate for any variation of thickness or surface.

The arm 15 has an integral extension 71 which has an arcuate slot 72 through which passes a locking screw 73 threaded into lug 74 secured to arm 43. Secured to the top of lug 74 is a plate 75 bearing an index line which cooperates with scale means 76, secured to the fixed arm 71, for indicating prism diopters. Slidably mounted in arm 71 is a pin 77 which cooperates with an opening in lug 74 for selectively locking the arm 43 and table 42 in a "zero" position. When pin 77 is withdrawn and the lug 53 is disengaged from notch 54, the table 42, together with the ring 45 and the arms 43 and 44 and the bridge 56, may be tilted about a horizontal axis and selectively locked in adjusted position by the screw 73.

This improved blocking stand can be used for securing a single lens blank to a lens block which is then transferred to a suitable lens grinding machine, such as that disclosed in U. S. Patent No. 1,901,181 issued on March 14, 1933. In using the device, a lens blank L, having its optical center marked and also its axis in case of a cylinder, is placed on pins 48. The optical center of the lens is located by means of the slidable rod 69 and in case of a cylindrical lens the axis is positioned by reference to the locating pins 55 and 55'. When the blank is properly located, it is firmly clamped in position by turning screw 62. A lens block 27, having a coating of pitch P, is secured to plunger 24 by means of the threaded rod 29 and knob 30. The positioning pin 77 is in place and the lug 53 is also in locked position so as to prevent the rotation of table 42. Set screw 19 is unloosened and collar 22 is turned until the index line 23' indicates the desired angular position of the cylinder axis of the lens, after which set screw 19 is tightened. The pitch on the lens block is then heated by a gas flame or other suitable means until the pitch becomes soft. The lens blank L is also heated. The operating handle 40 is moved upwardly thus bringing the pitched lens block up into contact with the lower surface of the lens blank L. After cooling, the lens block and attached blank are removed and transferred to the lens grinding machine.

If it is desired to block a lens blank so that the finished lens will be prismatic, the cylinder axis is first set by adjusting and locking collar 22. Set screw 17 is then unloosened and the yoke 14 with arms 15 and 16 is then turned about a vertical axis until the base-apex line of the prism is properly located as shown by scale 49. During this turning it will be noted that the lug 53 was in a locked position and so prevented rotation of the ring 45 which carries the lens blank L. After the base-apex line of the prism has been set and screw 17 tightened, the pin 77 is removed, the lug 53 is turned out of notch 54, and the table 42, carrying ring 45 and lens blank L, is then tilted about a horizontal axis. The amount of tilt determines the power of the prism and this is indicated in prism diopters on scale 76. When the lens has thus been titled the desired amount, the parts are locked in position by screw 73, heat is applied, the pitch coated block is moved into contact with the lens blank L, allowed to cool and then transferred to the grinding machine.

From the foregoing, it will be apparent that I am able to attain the objects of my invention and provide an improved device for blocking a lens preparatory to surfacing it in a suitable machine. The lens grinding machine has a suitable opening which cooperates with the pin 31 on the lens block so that the lens blank is properly located on the grinding machine. The device provides a convenient and accurate means for blocking a lens blank so that the finished lens will have the required prismatic power and properly located prism base and cylinder axis. Various modifications can obviously be made without departing from the spirit of my invention as pointed out in the appended claims.

I claim:

1. In a lens blocking device the combination of a body, a lens support rotatably mounted on said body, means for moving said support about an axis lying in a horizontal plane and means for relatively adjusting the position of said axis with respect to said lens support whereby a lens on said support can be selectively positioned on a lens block carried by said device.

2. In a lens blocking device the combination of a body member, a yoke rotatably mounted on said member to turn about a vertical axis, a table pivotally mounted on said yoke to tilt about a horizontal axis, lens supporting means rotatably mounted on said table and means for selectively locking said lens supporting means against rotation with respect to said body member.

3. A lens blocking device having in combination a body member, means movably mounted on said member for supporting a lens, a plunger slidably and rotatably mounted within said member, means for detachably securing a lens block to said plunger and scale means for indicating the extent of rotation of said plunger with respect to said body member.

4. In a lens blocking device the combination of a body member, a yoke rotatably mounted on said member, a table pivotally mounted on said yoke to tilt about an axis, lens supporting means on said table and scale means carried by said yoke for indicating the amount of tilt of said table in terms of units expressing prismatic power and means for attaching to a block a lens carried by said supporting means.

5. In a lens blocking device the combination of a body member, a yoke rotatably mounted on said member, a table pivotally mounted on said yoke, lens supporting means carried by said table, a bridge member carried by said table and means mounted on said bridge for releasably clamping a lens against said lens supporting means whereby the lens may be secured to a lens block.

6. In a lens blocking device the combination of a body member, a yoke rotatably mounted on said member, a table pivotally mounted on said yoke to tilt about a horizontal axis, lens supporting means rotatably mounted on said table, a lens block holder mounted adjacent to said means, a bridge pivotally mounted on said table, lens centering means carried by said bridge and scale means for indicating the angular tilt of said table with respect to a horizontal plane.

7. A lens blocking device comprising a base, a cylindrical body member secured to said base, a bushing rotatably mounted within said member, a plunger keyed to said bushing and slidable therein, means for detachably securing a lens block to said plunger, a yoke rotatably mounted on said body member, a table pivotally mounted on said yoke, lens supporting means movably mounted on said table and means for moving said plunger toward said lens supporting means.

8. A lens blocking device having in combination a body member, lens supporting means mounted on said body member, a plunger slidably and rotatably mounted within said body member, means for securing a lens block to said plunger and means for slidably moving said plunger, said last-named means comprising a pivotally mounted yoke, said yoke being operatively connected to said plunger by means permitting rotation of the plunger.

9. A lens blocking device having in combination a base, a cylindrical body member mounted on said base, a lens support mounted on said body member, a bushing rotatably mounted within said member, a plunger slidably mounted within said bushing, means for detachably securing a lens block to said plunger and means for moving said plunger, said last-named means comprising a disk secured to said plunger, a yoke pivoted on said base, said disk having a circumferential groove which is slidably engaged by bearing means on said yoke.

10. A lens blocking device comprising a base, a body member carried by said base, a plunger slidably and rotatably mounted within said member, means for securing a lens block to said plunger, a yoke rotatably mounted on said body member, a table pivotally mounted on said yoke, lens supporting means rotatably mounted on said table, means for selectively locking said lens supporting means against rotation relative to said body member, a bridge carried by said table, means on said bridge for releasably clamping a lens on said supporting means and means for slidably moving said plunger to bring a lens block into contact with a lens on said supporting means.

11. A lens blocking device having in combination a body, a lens support rotatably mounted on said body, means for moving said support about an axis lying in a horizontal plane, means for relatively adjusting the position of said axis with respect to said lens support, a lens block support and means for moving one support toward the other.

12. A lens blocking device comprising a body member, a yoke rotatably mounted on said member to turn about a vertical axis, a table movably mounted on said yoke to tilt about a horizontal axis, lens supporting means rotatably mounted on said table, means for selectively locking said lens supporting means against rotation with respect to said body member, a lens block holder movably mounted on said body member and means for moving said block holder toward said lens supporting means.

13. A lens blocking device comprising a body member, a yoke rotatably mounted on said member, a table mounted on said yoke to tilt about an axis, lens supporting means on said table, means for securing to a lens block a lens carried by said supporting means, and scale means carried by said yoke for indicating the amount of tilt of said table in terms of units expressing prismatic power.

JOSEPH J. McCABE.